United States Patent [19]
Smith et al.

[11] Patent Number: 5,509,696
[45] Date of Patent: Apr. 23, 1996

[54] CONNECTOR WITH SPRING RETAINER

[76] Inventors: Leary W. Smith, 3664 Keswick Dr., Chamblee, Ga. 30341; Clifford H. Boylston, 1892 Surry Trail, Conyers, Ga. 30208

[21] Appl. No.: 399,609
[22] Filed: Mar. 7, 1995
[51] Int. Cl.⁶ .................................................. F16L 35/00
[52] U.S. Cl. .................... 285/27; 285/177; 285/138; 138/108
[58] Field of Search ................. 285/7, 177, 176, 285/138, 24, 27, 12, 9.2, 305; 138/108, 109, 113; 403/3, 4

[56] References Cited

U.S. PATENT DOCUMENTS

| | | | |
|---|---|---|---|
| 1,374,307 | 4/1921 | McKissick | 285/138 |
| 1,935,999 | 11/1933 | Tessky | 138/108 |
| 2,325,616 | 8/1943 | Landweber | 138/113 |
| 2,388,587 | 11/1945 | Wilson | 285/138 |
| 2,866,648 | 12/1958 | Parsons . | |
| 3,209,198 | 9/1965 | Long et al. | 285/138 |
| 3,288,497 | 11/1966 | Nydam | 285/138 |
| 3,785,407 | 1/1974 | Waite et al. | 138/108 |
| 4,250,927 | 2/1981 | Newburg | 138/113 |
| 4,327,947 | 5/1982 | Bower, Jr. | 299/86 |
| 4,607,665 | 8/1986 | Williams | 138/108 |
| 5,082,027 | 1/1992 | Stanley | 138/108 |

FOREIGN PATENT DOCUMENTS 111516  9/1968  Denmark ............................... 138/108

*Primary Examiner*—Terry Lee Melius
*Assistant Examiner*—Heather Chun Shackelford
*Attorney, Agent, or Firm*—James B. Middleton

[57] ABSTRACT

An adapter for connecting one size of nozzle with a blower tip of varying sizes has a plurality of springs spaced there around. Each spring has straight portions resiliently urged towards the blower tip. At the entrance end of the adapter, the springs are sloped or tapered so the blower tip will gradually flex the springs towards the wall of the adapter. The springs may be solid, like leaf springs, or may be formed of wire; and, the springs may be made of polymeric material, metal or other elastic materials. In other embodiments, the springs may be fixed to the male member for receiving a female member thereon; and, the male or female member may have a slope rather than the springs. The spring members may have two straight portions parallel to each other, or only one straight portion.

19 Claims, 2 Drawing Sheets

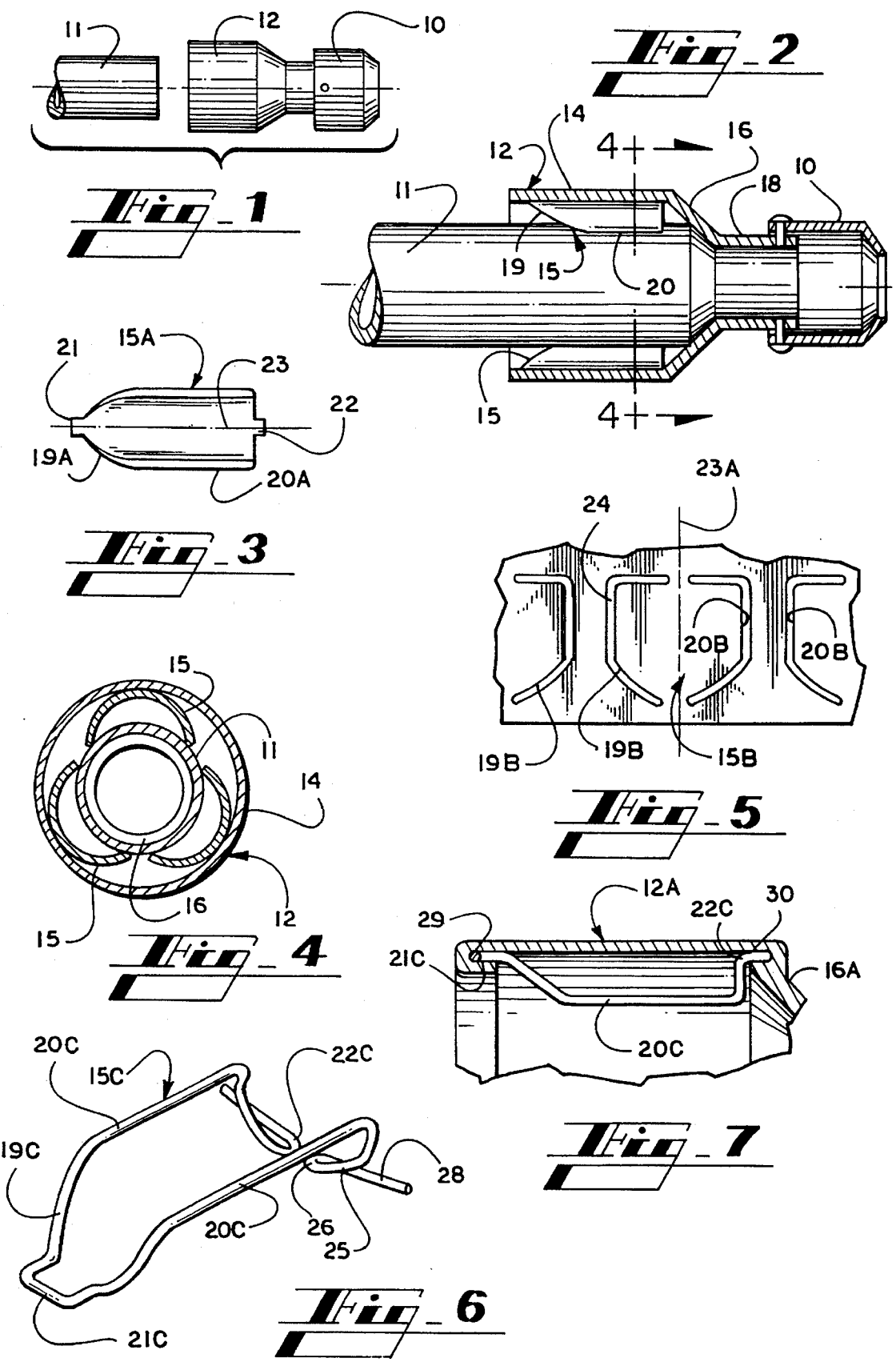

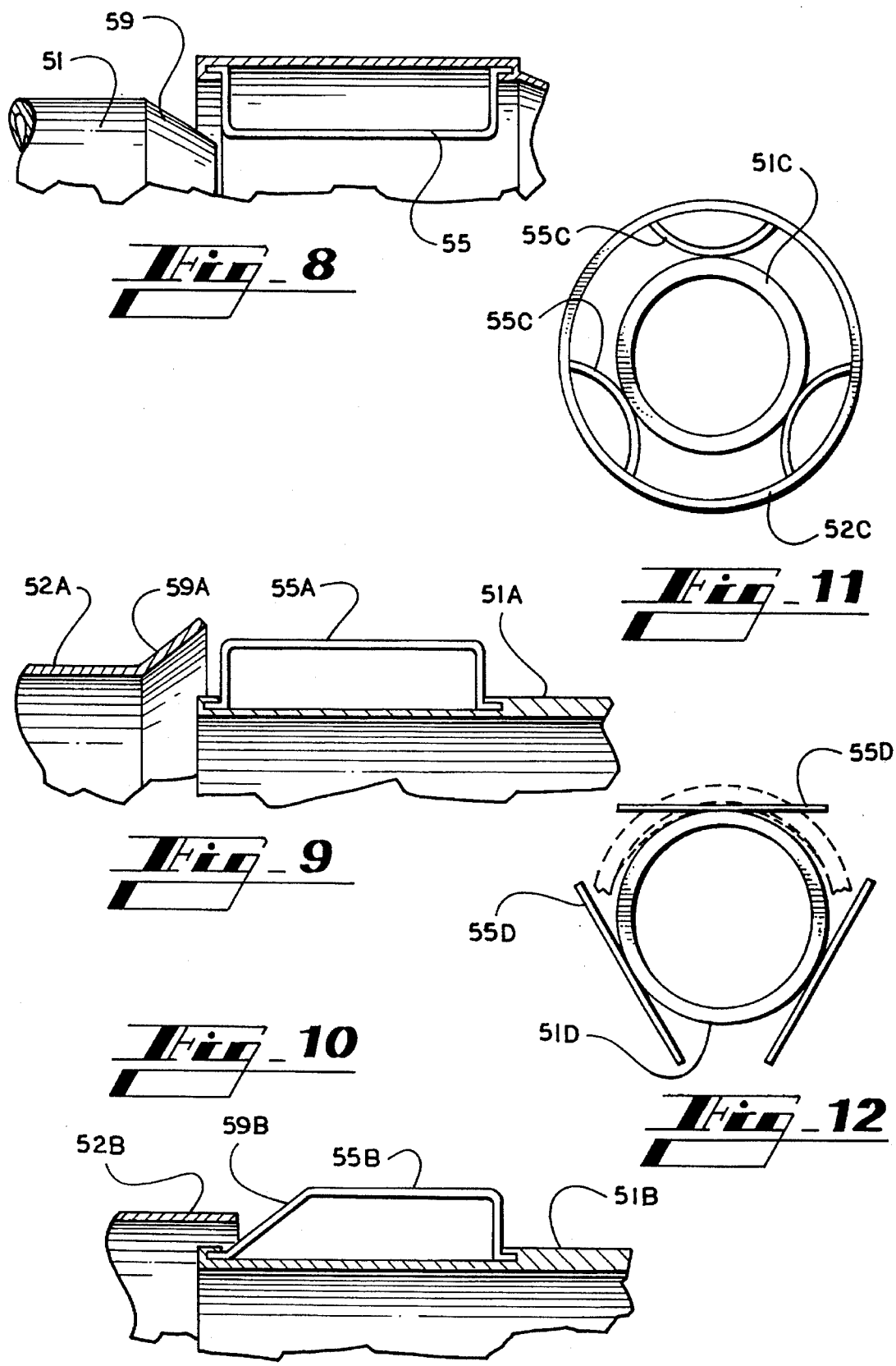

5,509,696

CONNECTOR WITH SPRING RETAINER

BACKGROUND OF THE INVENTION

1. Field of the Invention

This invention relates generally to connectors for pipes and other devices, and is more particularly concerned with means for connecting varying sizes of a device to another device of a given size.

2. Discussion of the Prior Art

There are numerous instances in which one pipe or other device is connected to another; and, couplings exist for same-size devices, and adapters or transition pieces exist to connect devices of different sizes. The more difficult problem arises when a device of one size is to be connected to other devices of varying sizes. There are some such connectors, and they usually include some form of spring means to hold the different members of the device together. The spring means, however, generally flexes about a line transverse to the centerline of the members being connected, and results in points of contact, or in rather short, transverse lines of contact for holding the members together. In other words, the bending moments that cause spring deflections are applied about lines that are generally perpendicular to longitudinal axes of the members that are joined.

One example of a spring adapter is shown in U.S. Pat. No. 770,399, to Strutz, which discloses a mandrel for holding a corncob pipe. The pipe bowls are of different sizes, so the mandrel has spring members to adapt to the various sizes; and, the spring members contact the bowl of the pipe along lines transverse to the centerline of the pipe bowl. Another example is shown in U.S. Pat. No. 4,327,947, to Bower, Jr., which discloses means for connecting a mining tool to a work holder. The tool includes spring members to secure the tool within the holder, and the spring members contact the work holder along lines transverse to the centerline of the work holder. Further examples are U.S. Pat. Nos. 4,230,279, 4,848,007 and 5,060,398 which disclose diffusers for hair dryers. These devices include a plurality of generally longitudinally extending fingers that are urged by an elastomeric band towards the barrel of the hair dryer. In such a device, however, as the barrel diameter increases in size from the smallest to the largest diameters, a correspondingly greater force is required to bring the two devices together since the elastomeric band must be sufficiently tight to cause the fingers to grip the smallest usable dryer barrel. It therefore requires considerably more force to assemble the two units when the barrel of the dryer is of maximum diameter.

SUMMARY OF THE INVENTION

The present invention provides a connector for different sizes of members to be connected wherein spring means contact the members along lines that are parallel to the centerline of such members. As a result, the spring means can have a relatively long line of contact for better stability and alignment between the two members to be connected; and, a plurality of such lines of contact provides secure connection between the members to be connected.

In the preferred embodiment of the invention the spring means flex about a line that is parallel to the centerline of the members being connected. The spring means may be generally solid, in the nature of leaf springs, or may be formed of wire. In either case, the spring means include sloped portions, or ramps, to facilitate guiding and flexing movement of the springs as the two members being connected are urged together.

BRIEF DESCRIPTION OF THE DRAWINGS

These and other features and advantages of the present invention will become apparent from consideration of the following specification when taken in conjunction with the accompanying drawings in which:

FIG. 1 is a side elevational view showing an adapter made in accordance with the present invention exploded from a supply pipe;

FIG. 2 is a longitudinal cross-sectional view showing the device of FIG. 1 in assembled condition;

FIG. 3 is a top plan view showing one spring of the leaf type for use in the device of FIG. 2;

FIG. 4 is a cross-sectional view taken along the line 4—4 in FIG. 2;

FIG. 5 is a plan view showing another form of the spring illustrated in FIG. 3;

FIG. 6 is a perspective view of another form of spring made in accordance with the present invention;

FIG. 7 is a fragmentary cross-sectional view showing a mounting means for the spring shown in FIG. 6;

FIG. 8 is a somewhat schematic illustration showing the ramp on the male member rather than on the spring means;

FIG. 9 is a view similar to FIG. 8 but showing the spring means mounted externally on the male member;

FIG. 10 is a view similar to FIG. 9 but showing the ramp on the spring means;

FIG. 11 is an end elevational view showing the spring means fixed to the outside on the male member; and, FIG. 12 is an end elevational view showing a modified arrangement having the spring means externally of the male member.

DETAILED DESCRIPTION OF THE EMBODIMENTS

Referring now more particularly to the drawings, and to those embodiments of the invention here presented by way of illustration, FIG. 1 discloses one use of the present invention, an oscillating nozzle 10 being applicable to a source of a stream of air, here shown as a blower tip 11. The oscillating nozzle 10 is disclosed in more detail in U.S. Pat. No. 5,333,787, issued Aug. 2, 1994. The present invention provides means by which such a nozzle can be added as an attachment to a blower, hair dryer, or other air source, exemplified by the blower tip 11.

An adapter 12 is selectively receivable on the blower tip 11, the adapter 12 carrying the nozzle 10. It will be understood by those skilled in the art that the blower tip 11 may be generally available in a plurality of different sizes. If the blower is a hair dryer, different manufacturers make the discharge ends, or barrel, different sizes; similarly, if the nozzle 11 is a leaf blower, different manufacturers will make the discharge end different sizes. The same will be true for other blowers on which the nozzle 10 may be used. As a result, the adapter 12 needs to be receivable on discharge ends of various sizes so a single adapter can have wide commercial use. Furthermore, some manufacturers of blowers make the discharge ends tapered, or somewhat conical. Such a taper may be to accommodate and accessory, or may be simply for aesthetic purposes, but it is desirable to provide an adapter that will be usable on these tapered discharge ends as well as straight ends.

Looking at FIG. 2 of the drawings, the adapter 12 comprises a housing having a wall 14 for receiving the blower tip 11, the wall 14 having a plurality of spring means 15 thereon. The forward end of the wall 14 tapers inwardly at 16, the smallest diameter being at least as small as the smallest blower tip 11. Connected to the taper 16 is the discharge end 18 mounting the nozzle 10. It will therefore be seen that the blower tip 11 can be inserted into the adapter 12, and the blower tip 11 will be engaged by the spring means 15. When the blower tip 11 is fully inserted, the end of the blower 11 will engage the taper 16 to effect a seal, facilitate centering alignment, and provide stability between the blower tip 11 and the adapter 12. Air being discharged will therefore flow through the discharge end 18 and through the nozzle 10.

For a better understanding of the spring means 15 attention is directed to FIGS. 2 and 4 of the drawings. It can be seen in FIG. 2 that the spring means 15 includes a sloped, or ramped, entry portion 19 followed by a straight holding portion 20. FIG. 4 shows that the spring means 15 may be arcuate, having their central portions fixed with respect to the wall 14. Those skilled in the art will understand that the spring means 15 may be integral parts of adapter 12, or may be separate parts that are bonded, welded, or otherwise fixed with respect to the wall 14, depending on the specific materials and sizes involved. Also, the spring means may be arcuate, generally flat, or otherwise shaped as will be understood from the following.

Considering the construction of the spring means 15, the blower tip 11 can be inserted into the adapter 12, and the end of the blower tip 11 will first engage the sloped portions 19 of the spring means 15. Because of the slope, the blower tip 11 will be relatively easy to insert, urging the spring means 15 to open, or to assume the shape of a wider arc. When the blower tip 11 reaches through the straight portions 20, the spring means will be as fully open as necessary; and, the entire straight portion 20 will engage the blower tip 11 to hold the adapter 12 in place. FIG. 4 shows three springs 15, so there will be six holding portions 20 holding the adapter 12 in position.

Since the holding portions 20 of the springs extend longitudinally of the blower tip 11 and the adapter 12, and flex about lines parallel to the centerlines of the blower tip and adapter, it will be understood that different sections of the springs 15 can flex to different extents. Thus, if a somewhat tapered, or somewhat conical, blower tip is inserted into the adapter 12, the full length of the holding portions 20 will still engage the blower tip and provide a good holding force.

In view of the construction described above, when a male member of a given size is inserted into an adapter as shown in the drawings, first contact of the male member and the ramps of the springs will occur at points on the springs about 90° apart relative to the semicircular shape of the spring, and on the camming surfaces, or ramps of the springs. As the male member enters, the wings of the spring begin to open, and the deflected stress on the springs is relatively light, but rapidly builds up as the male member progresses into the adapter and flexing increases.

As the male member progresses inwardly of the adapter, the nose, or leading end, acts as a cam actuator and forces the springs to flex open, or to spread. This spreading increases the spring moment length progressively as the spring tension builds up so that a correspondingly greater force is not required to force the male member to enter further into the adapter.

The ramp angle for the springs as shown in the drawings is about 45°. This allows a relatively long holding length on the springs. It is conceivable that, with a lesser angle on the ramps, an almost constant force would be required to start the male member into the adapter.

FIG. 3 of the drawings illustrates a spring means having locating and/or mounting means thereon. The spring means is designated as 15A and includes the ramp portions 19A and holding portions 20A. Centrally of the spring means 15A, along the centerline 23, there are mounting tabs 21 and 22 at the two ends. It is contemplated that the tabs 21 and 22 will be received within complementary grooves which both locate and hold the spring means 15A in the desired position. Such locating and/or mounting means will be discussed in more detail hereinafter.

FIG. 5 of the drawings illustrates another arrangement for achieving the spring means 15. In FIG. 5, the plurality of spring means 15B are formed from a single piece of material. The spring means 15B are defined by slots 24; and, it is contemplated that the two sides of the spring means 15B will be formed into the arcuate shape. Thus, the holding portions are indicated at 20B on opposite sides of the centerline 23A, and the ramp portions are indicated at 19B. The entire device can then be rolled to fit within the adapter 12, conforming to the wall 14. It will readily be seen that this spring means can be retained by a small shoulder or the like without being actually fixed to either the male or the female member. Nevertheless, the spring means 15B will be fixed with respect to one member while the other member engages the spring means.

In the above descriptions, the spring means 15 are solid members, but only the edges are actually used to contact the blower tip 11. It will therefore be realized that the central areas of the spring means can be omitted, and the device formed of wire. Such a spring means is shown in FIGS. 6 and 7, and designated at 15C.

The spring means 15C in FIG. 6 of the drawings is formed from a single piece of wire. It will be understood that the wire may be a spring steel wire, and of a gauge sufficient for the size and holding force desired. Also, the member 15C is formed with locating and mounting tabs 21C and 22C. In end view, the spring 15C may have an arcuate shape like the leaf springs 15 shown in FIG. 4 of the drawings.

The tab 21C is a bight in the wire, and the two legs from the bight form the ramp portions 19C. The ramp portions 19C merge into the holding portions 20C; then, the wire bends at generally 90° to provide the end of the spring 15C. It will be understood, however, that the end legs 25 are curved into an arc similar to the arc of the members 15 and 15A.

The lower ends of the legs 25 are bent into return bends 26 to form the tab 22C, and the final ends 28 are preferably bent along an arc having generally the radius of the wall 14. FIG. 7 illustrates the mounting of the spring 15C using the tabs 21C and 22C. Those skilled in the art will understand that the spring 15A shown in FIG. 3 can, with slight variation, be similarly mounted.

FIG. 7 shows a fragmentary portion of the adapter 12, here designated as 12A, and the tapered portion is designated at 16A. The tab 21C of the spring 15C is received within a groove 29 which extends completely around the entrance end of the adapter 12. A complementary groove 30 extends around the opposite end of the housing and receives the tab 22C, so the spring 15C is held in place.

It is contemplated that the final ends 28 will be of a length to act as spacers. Since the plurality of springs 15C will have the final ends 28 received within the groove 30, by making the total length of all the final ends 28 equal the circumference of the groove 30, the springs 15C will be mechanically spaced equidistantly. In this vein, it is also contemplated that the return bends 26 will place the final ends 28 at an angle of around 5° rather than 0°, to give a holding force when the tabs 21C and 22C are snapped into the grooves 29 and 30.

With the foregoing discussion in mind, it will be readily understood that a plurality of spring means 15 can be spaced around an adapter, and a pipe or other device can be inserted into, and held in, the adapter. The ramp 19 will allow easy entry, and the holding portions 20 will provide adequate holding force. The spring means 15, 15A, 15B and 15C may be made of metal, polymeric materials, or other materials so long as the material has the needed spring characteristics. The spring means may be solid, as are members 15, 15A and 15B, or may be open, as is 15C. It will also be readily understood that the spring means may be inverted and fixed to a male member 11 of a given size to allow receipt of varying sizes of female members 12. In such an embodiment, the spring means may be located adjacent to the end of the male member, or even have multiple sets along the male member to accommodate long female members.

The reversibility of the parts in the arrangement of the above described embodiment of the present invention is illustrated in FIGS. 8–12 of the drawings. FIG. 8 shows the ramp 59 on the male member 51, while the spring means 55 is uniform throughout its length. FIG. 9 shows a similar arrangement wherein the spring means 55A is mounted externally on the male member 51A, and the female member 52A includes a ramp 59A. FIG. 10, then, shows the arrangement of FIG. 9 wherein the ramp 59B is on the spring means 55B, while the spring means 55B is mounted externally on the male member 51B.

FIG. 11 is an end elevational view showing the male member 51C within the female member 52C, with a plurality of springs 55C mounted on the outside of the male member 51C. In FIG. 11, the springs 55C are inverted; but, FIG. 12 shows that the springs 55D can be without curvature and still function in accordance with the same operating principle as in FIGS. 9 and 10.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

We claim:

1. A connector for releasably holding a male member having a centerline coaxially within a female member having a centerline, said connector comprising a plurality of spring means externally of said male member and internally of said female member, each spring means of said plurality of spring means including a pair of holding portions and a central portion, said central portion of each spring means of said plurality of spring means being fixed with respect to one of said members so that said pair of holding portions are resiliently movable away from each other about lines parallel to the centerline of such member and resiliently engageable with the other of said members along lines parallel to the centerline of such member, and further including camming means interacting with said other of said members for flexing said pair of holding portions as said male member is urged into said female member.

2. A connector as claimed in claim 1, wherein said spring means is fixed to said female member.

3. A connector as claimed in claim 1, said each spring means including a pair of ramp portions extending from said central portion to said pair of holding portions, said ramp portions constituting said camming means.

4. A connector as claimed in claim 3, wherein said each spring means comprises a pair of holding portions, and a central portion for fixing said spring means to said female member.

5. A connector as claimed in claim 1, said male member further including a tapered end to be received by said female member, said tapered end constituting a member of said camming means.

6. A connector as claimed in claim 1, wherein said spring means is fixed to said male member.

7. A connector as claimed in claim 6, said female member further including a tapered end for receiving said male member, said tapered end interacting with said male member and constituting said camming means.

8. An adapter for connecting a first device of a given size with a second device of varying sizes, said adapter comprising a housing for receiving said second device therein, said housing having a centerline, and said second device being receivable concentrically with said housing, a plurality of spring means within said housing, each spring means of said plurality of spring means including a central portion fixed to said housing along a first line parallel to said centerline, a pair of holding portions parallel to said centerline and resiliently engageable with said second device along straight second lines parallel to said centerline, said holding portion being movable about said first line parallel to said centerline, and a pair of ramp portions tapering from said holding portions to said central portion for ease of insertion of said second device, said pair of holding portions being biased to move towards each other and towards said centerline.

9. An adapter as claimed in claim 8, said each spring means further including a pair of holding portions, and a central portion fixed to said housing along said second line parallel to said centerline, said pair of holding portions being movable about said second line parallel to said centerline, and being biased to move towards said centerline.

10. An adapter as claimed in claim 9, said each spring means further including a pair of ramp portions, each ramp portion extending from said central portion to said holding portion so that said second device will gradually urge said holding portions towards said housing as said second device is received by said adapter.

11. An adapter as claimed in claim 10, wherein said spring means comprises a leaf spring having a centerline, said holding portions being parallel to said centerline of said leaf spring and resiliently movable about said centerline.

12. An adapter as claimed in claim 10, wherein said spring means is formed of wire and includes a bight connecting said ramp portions, said bight forming a first tab, said holding portions being integral with said ramp portions, end legs integral with said holding portions, and bends integral with said end legs, said bends constituting a second tab, said first and second tabs constituting said central portion of said spring means.

13. An adapter as claimed in claim 12, and further including spacers integral with said bends, said spacers having a length sufficient for mechanically spacing said plurality of spring means from one another.

14. An adapter as claimed in claim 8, wherein said plurality of spring means are equally distributed around said housing.

15. An adapter as claimed in claim 14, wherein said plurality of spring means comprises at least two spring means.

16. A spring, for use in a connector for a male member and a female member, said spring comprising a central portion having a centerline, said central portion being fixed with respect to one of said members, a pair of holding portions parallel to said centerline and resiliently movable about said centerline, and ramp portions extending from said central portion to said holding portions.

17. A spring as claimed in claim 16, and further comprising tab means for locating said spring with respect to said members, said tab means being at each end of said central portion.

18. A spring as claimed in claim 16, wherein said spring is a leaf spring comprising a body, said ramp portions comprising sloped portions of said body, and said holding portions comprising opposite edges of said body.

19. A spring as claimed in claim 16 wherein said spring is formed of wire and includes a bight connecting said ramp portions, said holding portions being integral with said ramp portions, legs integral with said holding portions, and bends integral with said legs.

* * * * *